United States Patent [19]

Ramchandran

[11] Patent Number: 5,805,174
[45] Date of Patent: Sep. 8, 1998

[54] DISPLAY LIST ARCHITECTURE HAVING TWO DIMENSIONAL ARRAY OF ZONES

[75] Inventor: Padmanabhan Ramchandran, San Diego, Calif.

[73] Assignee: Hewlett-Packard Company, Palo Alto, Calif.

[21] Appl. No.: 953,223

[22] Filed: Oct. 17, 1997

Related U.S. Application Data

[63] Continuation of Ser. No. 518,634, Aug. 23, 1995, abandoned.

[51] Int. Cl.$^6$ .................................................... G06F 15/00
[52] U.S. Cl. ........................................... 345/501; 395/101
[58] Field of Search ..................................... 345/501, 502, 345/522, 525, 526, 196, 507; 395/101, 105, 115, 117

[56] References Cited

U.S. PATENT DOCUMENTS

| 4,694,405 | 9/1987 | Bradbury et al. | 364/518 |
|---|---|---|---|
| 4,723,211 | 2/1988 | Barker et al. | 364/300 |
| 5,058,042 | 10/1991 | Hanna et al. | 364/522 |
| 5,250,940 | 10/1993 | Valentaten et al. | 345/189 |
| 5,295,235 | 3/1994 | Newman | 395/133 |
| 5,319,748 | 6/1994 | Motoyama | 395/101 |
| 5,509,115 | 4/1996 | Butterfield et al. | 395/147 |
| 5,594,860 | 1/1997 | Gauthier | 345/501 |

FOREIGN PATENT DOCUMENTS

| 0 432 896 A2 | 6/1991 | European Pat. Off. | G06F 15/72 |
|---|---|---|---|
| 0 480 637 A2 | 4/1992 | European Pat. Off. | G06K 15/00 |

OTHER PUBLICATIONS

Anthoy D. Parkhurst et al., "Connectivity of the HP DeskJet1200C Printer," Feb. 1994 Hewlett–packard Journal, pp. 85–97.

Primary Examiner—Kee M. Tung
Assistant Examiner—Cao H. Nguyen

[57] ABSTRACT

The present invention uses a display list where each swath is segmented into a plurality of zones (or tiles) and each zone is processed as a separate unit. Objects going into the display list are clipped to horizontal and vertical zone boundaries by a parser. The individual zones in the display list are ultimately rasterized by an image processor, and a number of rasterized zones are temporarily stored in bit-mapped buffers. Hence, it is now possible to mix 0, 1, and 3-plane (CMY) zones in a single swath, resulting in faster throughput because fewer pixels are rendered, rotated, copied and erased. The invention also results in lower memory requirements for both the display list memory and the bit-mapped memory.

29 Claims, 3 Drawing Sheets

DISPLAY LIST ARCHITECTURE HAVING TWO DIMENSIONAL ARRAY OF ZONES

CROSS REFERENCE TO RELATED APPLICATION(S)

This is a continuation of application Ser. No. 08/518,634 filed on Aug. 23, 1995, now abandoned.

FIELD OF THE INVENTION

This invention relates to image processing and in particular to a method for creating and using a display list.

BACKGROUND OF THE INVENTION

In many types of printers, such as the HP DeskJet 1200C printer, control and display information from the host computer to the printer is provided in a high level page description language (PDL) and then converted by the printer into a raster scan type format. The printer then applies the data in the raster scan format to the print engine for printing on a medium. Since the printer, and not the host computer, performs the processing of the high level commands, the computer is able to more quickly support the user.

The HP DeskJet 1200C is a color inkjet type printer using a black pen, a cyan pen, a magenta pen, and a yellow pen. The pens are positioned in a carriage which scans across the medium to print swaths or bands of the image, such as text, vector graphics, or photographs. After each swath is printed, the medium is shifted in a direction perpendicular to the direction of scanning. Drops of black ink or color ink are selectively emitted by the scanning inkjet printheads to form dots or pixels on the medium. These dots are closely spaced, or overlapping, and the individual dots are indistinguishable from one another. Many colors are created by the various combinations of cyan, magenta, and yellow ink.

The page description language transmitted to the printer describes shapes to be displayed using coordinates and primitives such as rectangles, vectors, circles, or polygons. Text is described by designating characters, positions, and fonts rather than describing the appearance of the characters. The page description language also identifies operations to be performed on the shapes, such as copying a shape onto a particular background pattern or color. Such a page description language is in contrast to a simple pixel-by-pixel description, where each pixel to be printed is transmitted to the printer in a raster scan order and stored in a frame buffer, although such a transmission in raster scan format is permitted in conjunction with the high level language when a complexity threshold is exceeded.

A language parser, to be described later, performs some processing of the PDL instructions and stores the objects to be printed and their attributes in a display list. The display list keeps track of attributes like color, pattern, logical operations, and other descriptors, on a swath-by-swath basis. Certain display list architectures are described in U.S. Pat. Nos. 5,250,940, 5,058,042, and 4,694,405, incorporated herein by reference to provide additional detail of conventional components used in a display device and to convey the level of skill in the art.

An image processor then rasterizes the objects in the display list for printing by the print engine. The article, "Connectivity of the HP DeskJet 1200C Printer," by Anthony Parkhurst et al., Hewlett-Packard Journal, February 1994, pages 85–97, describes this well known interface between a host computer and the HP DeskJet 1200C color printer. This article is incorporated herein by reference. Such an interface is similar to the interface used by other printers.

One well known page description language is the PCL-5C language, which is described in detail in the Hewlett-Packard publication entitled "PCL 5 Printer Language Technical Reference Manual," Manual Part No. 5961-0509, 1992, incorporated herein by reference. A programmer who is developing a graphics program may use such a PCL-5 language to define the images to be displayed. Other page description languages include PostScript and HP-GL/2, among others.

The amount of display list memory required in the printer and the time it takes to successfully render and print a page is directly proportional to the complexity of the page description. The memory capacity in the HP DeskJet 1200C is 2 megabytes but is expandable to up to 26 megabytes for more complex graphics.

Figures 1, 2:
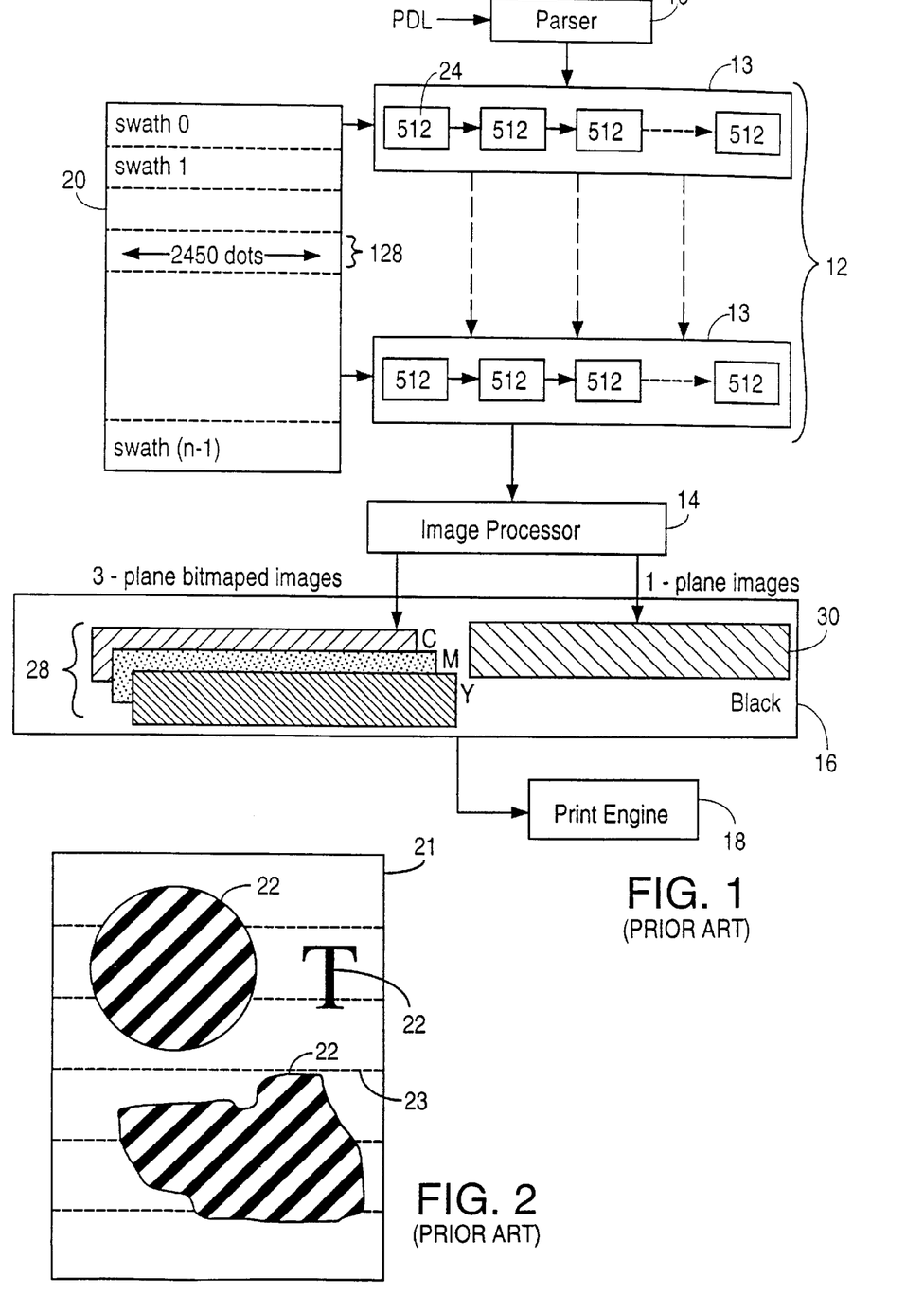
FIG. 1 illustrates a page layout for a typical 300 dpi printer along with its associated display list memory structure, image processor, and swath buffers.
FIG. 2 illustrates a printed page having certain shapes printed thereon with the swath boundaries shown by dashed lines.

FIG. 1 illustrates certain key elements in a printer which convert the high-level PDL data stream from the host computer into a simple data stream for the print engine.

A language parser 10 in the printer scans the incoming PDL data stream, recognizes commands in the data stream, and performs the requested functions. These functions relate to, for example, the description and location of an object on a page and operations to be performed on that object. Parser 10 may also generate a bit map of a requested text character. The parser 10 output is stored in a display list 12.

The display list 12 consists of data in a memory describing a page to be printed. The data is segmented into an array of swath lists 13, one swath list 13 for each band to be printed on the page, with each swath list holding all the objects to be printed belonging to that band. Once the page description in display list 12 is complete, the swath lists 13 are then processed sequentially by an image processor 14 and rendered into horizontal bands of raster data for storage in a bit-mapped swath buffer 16. The bit-mapped pixel data are then further processed, such as rotated and shifted, by a formatter and sent to a print buffer within the print engine 18 for printing during a scan. The pixel data in the print buffer is specially arranged for the particular scanning printheads used. For example, the arrangement of pixel data in the print buffer depends on the nozzle configurations of the scanning printheads.

The bit-mapped swath buffer 16 has statistically allocated memory for two full color swaths so that image processor 14 could be rasterizing into one set of CMY planes in swath buffer 16 while pixel data in the other set of CMY planes in buffer 16 is being processed for use by print engine 18.

An example of a page layout 20 is shown for a 300 dots per inch (dpi) printer. In one example, there are 25 swaths per page, where each swath is 128 dots high and 2,450 dots wide. FIG. 2 illustrates a printed page 21 with objects and text 22 printed thereon. Dashed lines 23 represent the swath boundaries.

Based on the location of an object on the page, the language parser 10 identifies the appropriate swath list 13 in display list 12, and the object information is copied into data blocks 24 tagged for that swath list 13. Each data block 24 is, for example, 512 bytes, and the data blocks 24 form a linked list, where each data block 24 identifies a next data block 24 to be processed. The number of data blocks 24 required for a swath depends on the complexity of the image to be printed in that swath. Any object that crosses swath boundaries is split into sub-objects that are clipped to the swath limits. The order that objects are transmitted to the printer from the host computer does not have to be in the order in which the objects appear on a page, since the language parser 10 performs this positioning function.

Image processor 14 processes each data block 24 in sequence. Processor 14 looks at the opcode of each object and rasterizes it into cyan, magenta, and yellow (C,M,Y) bit-mapped images 28 (for color printing) or a single monochrome image 30 (for monochrome printing). The rasterized data is stored in swath buffer 16. As previously described, this rasterized data is further processed by a formatter in print engine 18 for actual printing.

As can be understood by the above description, the amount of memory consumed by the display list 12 is directly proportional to the complexity of the page description. Some extremely complex pages can cause the display list 12 to potentially grow very large and run out of memory.

In certain printer designs, such as the HP DeskJet 1600 C, memory contention problems are alleviated to an extent by making use of Memory Enhancement Technology (MEt). MEt comprises different memory optimization techniques that are applied at different stages of the data formatting process. One of the stages where MEt is heavily used is at the time of parsing and building the display list 12. Whenever the complexity of a swath is detected as being above a predetermined threshold, the swath is pre-rasterized and compressed, if necessary, using conventional memory enhancing techniques. The compressed data is now stored in the swath list. This reduces the amount of memory needed to store the swath, and the now unused display list blocks are released. This places a ceiling on the memory usage for a swath.

A new generation of printers Hewlett-Packard is introducing print at a resolution of 600 dpi. This increases the dot density by four times that of a 300 dpi printer. It would be relatively expensive to simply increase the memory size of the bit-mapped swath buffer 16 by four times and concomitantly increase the complexity of the image processing hardware/software. Accordingly, what is needed is an innovative design for processing image data for printing which makes more efficient use of the memory in the printer. Also, it would be desirable for the processing functions to not be significantly slowed by an increased pixel resolution.

SUMMARY

Instead of a conventional display list arrangement which segments a page to be printed into full swaths, where each swath is processed as a unit, the present invention uses a display list where each swath is segmented into a plurality of zones (or tiles), and each zone is processed as a separate unit.

Objects going into the display list are clipped to horizontal and vertical zone boundaries by a parser. The individual zones in the display list are ultimately rasterized by an image processor, and a number of rasterized zones are temporarily stored in bit-mapped buffers (actually part of a single memory).

In prior art buffers for storing rasterized bits for a swath, a buffer capacity for two full swaths is generally used: one stored swath for being accessed by the print engine and the other stored swath for being accessed by the image processor when rasterizing data from the display list. If conventional techniques were used for a printer having twice the resolution (e.g., 600 dpi) of a prior art 300 dpi printer, then the static swath buffer capacity would have to be increased by a factor of four. Using the present invention, however, assuming four zones per swath, only five zones of bit-mapped buffers need be allocated in a typical case to support both the print engine and the image processor. This translates to a bit-mapped memory capacity of only 1.25 swaths, as compared to a capacity of two full swaths using conventional techniques. For a 600 dpi printer, this technique results in a memory savings of about 400 Kbytes.

Additionally, in prior art designs, the complexity of a full swath in the display list is compared to a predetermined threshold to determine whether that swath should be rasterized and, if necessary, compressed to save display list memory. If the resolution of the printer were doubled, the complexity threshold for a swath would go up by a factor of four, resulting in a very large display list memory. By dividing each swath into four zones, the complexity threshold for each zone can be the same as the complexity threshold for each swath in the lower resolution printer. This reduces the required size of the display list.

In addition, since a zone, and not a full swath, is now being processed as a unit, the image processor which translates the display list contents to rasterized data for storage in the zone buffers can pass a one-plane monochrome tile or a three-plane CMY color tile to the print engine, even though these tiles are in the same swath. This improves performance as it takes less time to process a single plane tile. Hence, it is now possible to mix 0, 1, and 3-plane tiles in a single swath, resulting in faster throughput because fewer pixels are rendered, rotated, copied and erased by the print engine.

Any number of zones per page may be utilized in this invention.

Accordingly, the present invention results in huge memory savings in both the display list and the bit-mapped buffers for storing the rasterized pixels for printing.

DETAILED DESCRIPTION OF THE PREFERRED EMBODIMENTS

As previously described, the present invention enables the page storage memory (i.e., display list) and bit-mapped memory of a printer or other display device to have a relatively small capacity as compared to that of conventional display devices having the same resolution.

Figure 3:
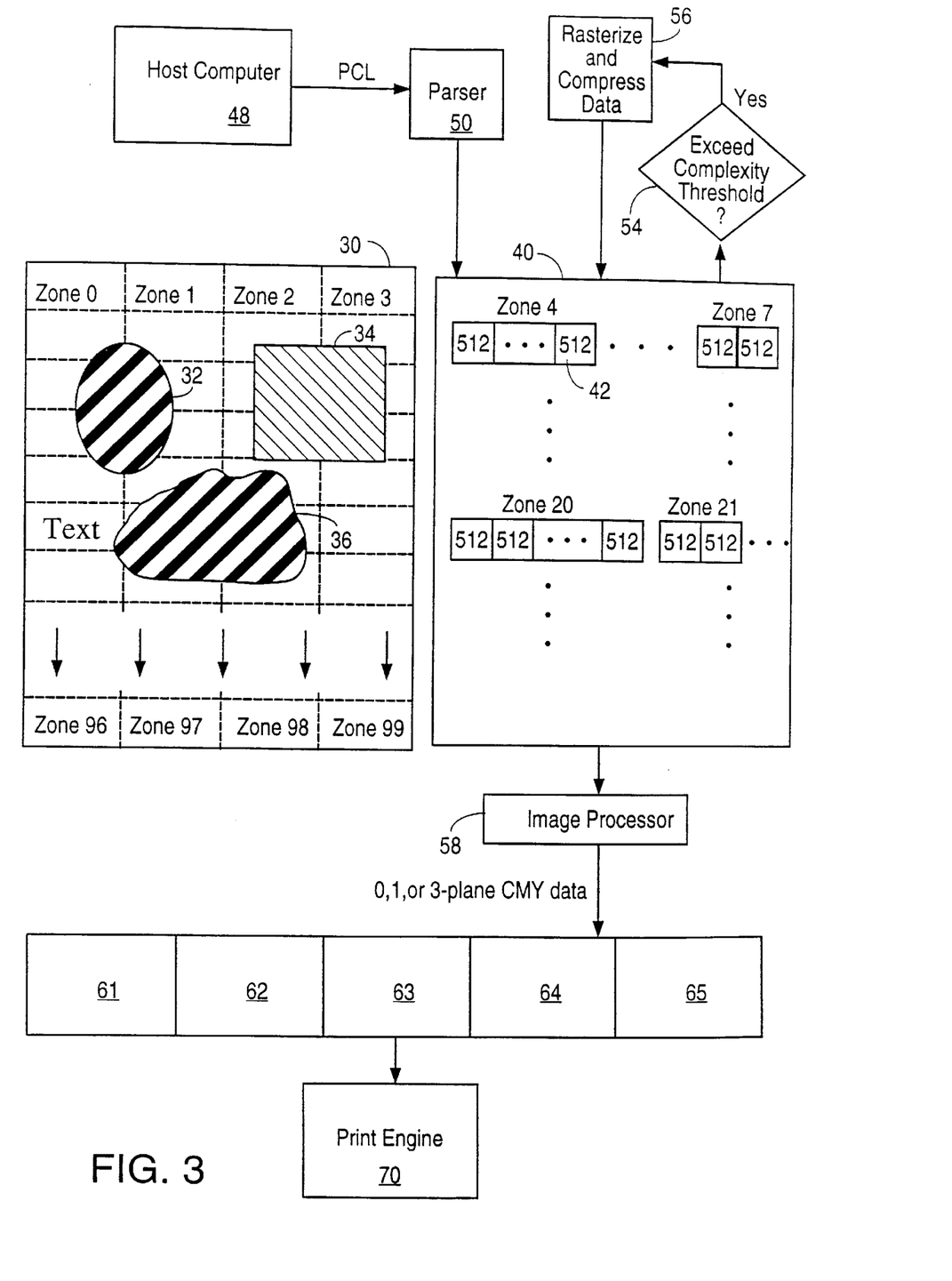
FIG. 3 illustrates the relevant components of a display device in accordance with the invention.

FIG. 3 illustrates the relevant portions of a novel printer or other display device which receives page description language (PDL) commands and data from a host computer and ultimately converts this PDL information into rasterized pixel data for use by a print (or other display) engine. The print (or other display) engine may be that in a conventional inkjet printer, facsimile machine, plotter, copier, CRT, LCD screen, or other display device.

FIG. 3 shows an example of a resulting printed page 30 having an oval 32, a rectangle 34, and an arbitrarily shaped object 36 printed thereon. Rectangle 34 is assumed to be a monochrome gray image, while shapes 32 and 36 are assumed to be color images requiring combinations of CMY inks. The page 30 is shown divided into zones 0–99, although these zone boundaries would not be printed on the page.

A display list 40 for storing objects, along with their characteristics, locations, etc., to be printed on the page 30 is shown having data stored in data blocks 42 of 512 bytes/block for the various zones. The memory required in display list 40 for each zone is generally related to the complexity of the image to be printed in a particular zone. For example, if a zone is blank, then no memory in display list 40 is utilized for that zone. Hence, the number of blocks 42 per zone is variable. It would be understood by those skilled in the art that conventional techniques for conserving display list memory may be utilized, such as by not repeating pattern descriptions (e.g., letters) but simply identifying the locations of previous patterns and issuing a copy command.

The blocks 42 are arranged in a linked list where each block 42 associated with a zone is read sequentially.

It will be assumed for purposes of illustration that the user has constructed the particular pattern of shapes 32, 34, and 36 on a host computer 48 and has initiated a print sequence for printing this image onto a medium.

A printer driver routine previously programmed into the host computer 48 is sometimes used to interface a particular printer with an application program. The printer driver need not be specially modified to adapt to the present invention since the present invention may be entirely implemented within the printer itself. However, it should be understood that the printer driver may be modified as desired if such modifications would improve the performance of the printer when using the present invention.

The PDL output of host computer 48 is transferred to the printer. In the preferred embodiment, the PDL is in a PCL-5 format. The PCL-5 formatter architecture used by the printer is based on the construction of a display list of objects that are generated by a language parser 50 from the incoming PCL-5 data stream. Parser 50 recognizes commands in the data stream and generates the appropriate data and opcodes in accordance with the invention. The output of parser 50 is stored as a display list 40 in a memory located in the printer.

Display list 40 may comprise part of a larger memory in the printer and need not be a discrete component. For example, the memory may be a dynamic memory (DRAM) which also stores instructions for the printer. Display list 40 keeps growing until the page description is complete and the page closed. The objects (e.g., objects 32, 34, and 36) in display list 40 need not be transmitted by computer 48 in the top-to-down order the objects appear on a page.

The objects in display list 40 are ultimately rasterized into one-plane monochrome or three-plane CMY tiles (one tile per zone) and passed to the print engine for further processing and actual printing, such as by black, cyan, magenta, and yellow inkjet printheads. Other than the basic object definitions, display list 40 also receives certain attributes, such as foreground color, patterns, and other functions (e.g., raster operations) that characterize the nature of the display list objects in its rendering process. The state changes are typically enqueued in display list 40 prior to the objects they affect. Such general display list formats are well known and will not be further described in detail. Those skilled in the art of display devices which process a page description language or other similar high-level language would already be intimately familiar with the existing devices, such as those illustrated in FIG. 1; therefore, this disclosure will focus mainly on the differences between the conventional devices and the present invention.

Upon receiving the PDL data from the host computer 48, parser 50 selects the appropriate zone (zone 0 through zone 99) or zones where the object will be printed on the page, and the object information is copied into data blocks 42 along with an opcode identifier and a zone identifier.

An opcode identifier generated by parser 50 uniquely identifies an object type in the display list. Examples of objects in the display list include: rectangle, horizontal vector, vertical vector, steep vector, shallow vector, small vector, text character, foreground color, logical operator, and clipping windows. These objects are defined by packed-bit-field structures and copied into the 512 byte data blocks 42. Each structure begins with a 4 to 8 bit opcode that identifies the object. While unpacking the display list 40, the image processor 58 examines the first 4 bits for object group information and the next 4 bits for the object type. From that opcode, the image processor 58 knows how many bytes to unpack to read the complete object definition. An example of the opcode fields for a rectangle is provided below:

| OBJECT TYPE - RECTANGLE (7 BYTES) | | |
|---|---|---|
| Primary-opcode | :4 bits | (polygon group) |
| Secondary-opcode | :4 bits | (rectangle) |
| Y | :8 bits | (distance from top of zone) |
| x | :16 bits | (distance from left edge of zone) |
| width | :14 bits | (width of rectangle in zone, in pixels) |
| height | :10 bits | (height of rectangle in zone) |

The information in the data blocks 42 identifies the address of the next data block 42 so that the blocks 42 form a linked list. Any object that crosses into another zone is split into a sub-object that is clipped to the zone limits. For example, a large, multi-zone rectangle will be split into a number of smaller rectangles. The opcodes identifying the position of an object in a zone are referenced to the zone boundaries. The number of data blocks 42 associated with a particular zone will of course relate to the actual complexity of the information to be printed within that zone.

Since the size of the display list memory is limited, the preferred embodiment of the invention also includes a means for determining the complexity of the image in a zone and, if this complexity exceeds a certain threshold level, that data is converted into a pre-rasterized image and then compressed, if necessary, using conventional compressing techniques. This compressed raster image then replaces the corresponding data in display list 40 to thus free up data blocks 42 for use by other zones as necessary. More specifically, a complexity threshold circuit or algorithm 54 analyzes the data in a particular zone and determines whether the memory required for that display data exceeds a certain complexity threshold. If the threshold is not exceeded, no action is performed on display list 40. If the threshold is exceeded, then the rasterization circuitry/algorithm 56 rasterizes the display data in that zone and, if necessary, uses conventional compression techniques, such as run-length encoding, to compress the data. The compressed data is then written into the display list 40 for the corresponding zone. Such rasterization and compression puts an upper ceiling on the memory required for a single zone to make it more likely that the display list 40 will not run out of memory when storing information for an entire page.

A more complete description of the preferred embodiment Memory Enhancement Technology (MEt) routines performed by functional blocks 54 and 56 is provided in FIG. 4, described later.

Once display list 40 has stored the information for an entire page, the data associated with each zone, in sequence, is processed by an image processor 58 for rasterizing the information in each zone. The rasterizing process used by image processor 58 may rely upon conventional techniques already used in printers processing PDL unless otherwise specified herein.

Image processor 58 calls on each zone location in sequence using pointers (0–99) to determine whether there is data in display list 40 for that zone.

Only zones containing image data are processed. When zones contain no data, the print engine 70 is controlled to skip to the next zone where printing is required. The paper transport mechanism may also be controlled to forward the paper sheet to the next location where printing is to resume.

The rasterized output of image processor 58 for a zone is then stored in one of five static zone buffers 61 through 65 (actually part of a single memory chip), where each zone buffer 61–65 is a bit-mapped memory for the monochrome or CMY color tiles having locations corresponding to each dot position within a single zone on the page 30. The size of each buffer 61–65 would, of course, depend upon the number of zones in a page. The height of a zone need not be the same as a single swath printed by the print engine 70 in a single scan. The number of buffers required would depend upon the number of zones across a page 30 and the image processing speeds, since the buffers 61–65 would normally be accessed by both the image processor 58 and the print engine 70. In the preferred embodiment, the number of zone buffers used (i.e., five) is one more than the number of zones across a page 30.

The print engine 70 has to copy zone buffer data into its print buffer in a format that the print cartridge ASICs can access. The scanning printheads in print engine 70 typically scan across the width of the page 30 only after a full scan (or swath) of printing control data (4 zones of data) is fully formatted and stored in the print engine's print buffer. An ASIC would typically be used to perform the processing of pixel data for storage in the print buffer. The configuration of the pixel data in the print buffer is dependent upon the particular scanning printheads used. Therefore, the print engine 70 typically requires a print buffer memory size necessary to store all pixel data for a single swath, or four zones in the present example.

Since, in most situations, the printheads in print engine 70 cannot begin printing a swath until the entire swath is first loaded into the print buffer by a formatter, four zone buffers (e.g., 62–65) may be tied up by the print engine 70 while pixel data is being processed for storage in the print engine's print buffer. This is a very short span of time for which the image processor 58 has a fifth zone buffer to work ahead. This is just to minimize the delays between different tasks that are running concurrently. Hence, in the particular example of four zones per swath, only five buffers 61–65 are deemed required (i.e., one more than a full swath), where up to four of the zone buffers are being accessed for use by the print engine 70 while one or more of the remaining buffers are being written into by the image processor 58.

In a preferred embodiment, the print engine 70 of an existing printer remains basically unchanged even when the printer is modified to incorporate the present invention.

In a color printer, each buffer 61–65 consists of three-planes of memory, one plane for each of the primary colors, cyan, magenta, and yellow. A monochrome image in a zone using only black ink would only require a single plane in a buffer 61–65 to store this rasterized monochrome image.

The memory for the zone buffers 61–65 is controlled by a memory manager. If a zone is tagged as monochrome in display list 40, a single-plane buffer is requested by image processor 58, otherwise a three-plane buffer is requested. When a formatter in the print engine 70 processes the data in zone buffers 61–65, it sends a header along that describes things like top-offset, left-offset, dimensions, and plane-format. The plane-format field indicates whether the pixels to be printed for that zone are CMY or black. Based on this information, the print engine 70 looks for one or three planes of data when retrieving data from zone buffers 61–65.

Once the rasterized data is properly formatted for the scanning printheads, the print engine 70 may then selectively energize the individual ink ejection elements in the scanning printheads, or selectively control the appropriate pixel elements in any form of display screen or other display device. The buffers 61–65 would normally be accessed sequentially by image processor 58 and print engine 70. Formatting pixel data for a print engine or other display type engine may be conventional and already understood by those skilled in the art.

If conventional techniques for storing the rasterized data were used rather than using zone buffers 61–65 in FIG. 3, a swath buffer memory capacity equal to two full swaths would be necessary as described with respect to buffer 16 in FIG. 1. However, using the present invention in the example described, only a capacity of 1.25 swaths are needed. At 600 dpi, this memory savings amounts to over 400K bytes for all there planes.

One example of a printer having scanning printheads is described in U.S. Pat. No. 5,408,746, entitled "Datum Formation for Improved Alignment of Multiple Nozzle Members In a Printer," assigned to the present assignee and incorporated herein by reference.

Figure 4:
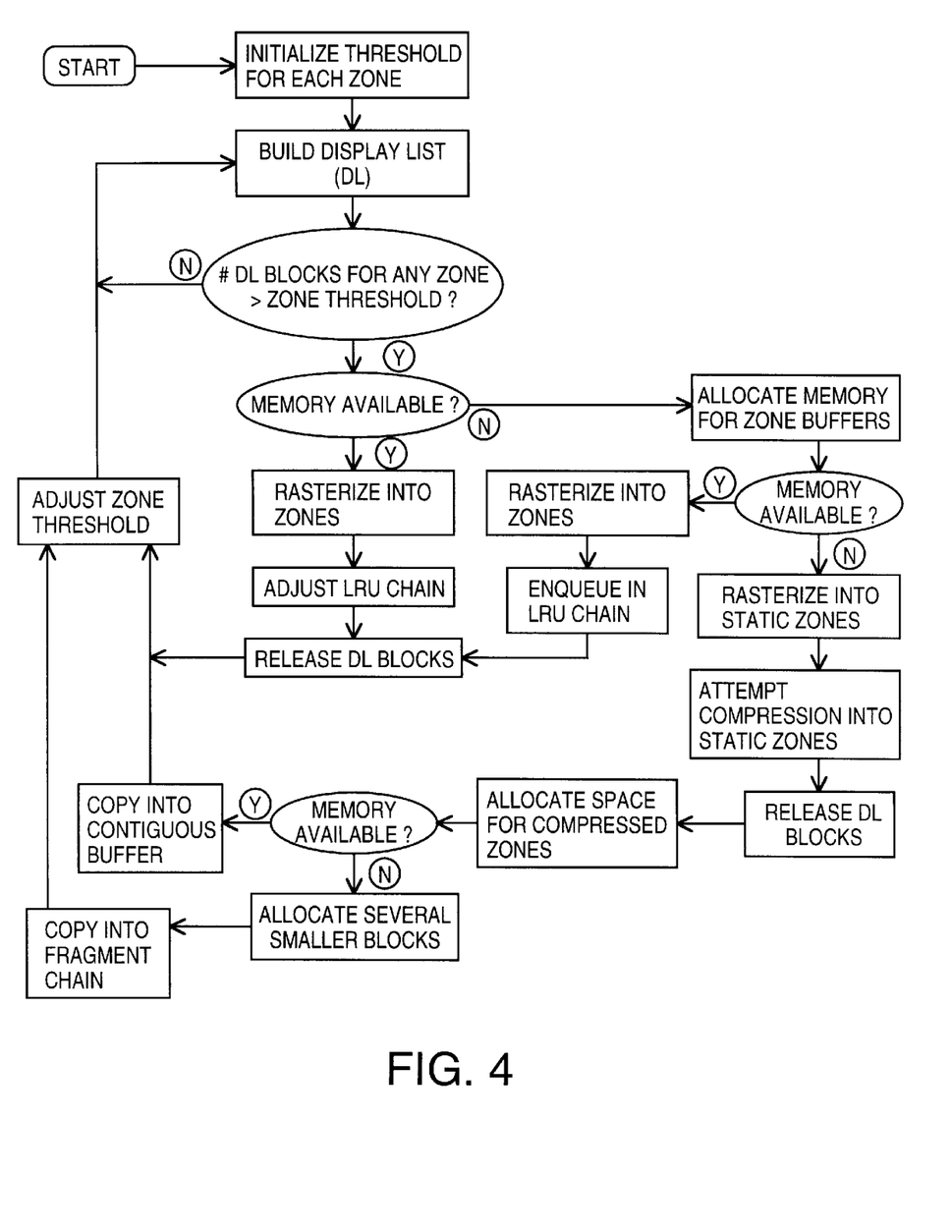
FIG. 4 is a flow chart describing the various Memory Enhancement Technology (MEt) steps used to reduce the required memory needed for the display list in accordance with the preferred embodiment of the invention.

FIG. 4 illustrates a preferred Memory Enhancement Technology (MEt) routine performed by functional blocks 54 and 56 in FIG. 3. The MEt process illustrated in FIG. 4 attempts to ensure that there will be sufficient memory space to store an entire display list 40.

In a first step, a threshold criteria is initialized for each zone. This threshold criteria may be the maximum number of data blocks 42 allowable for use by a single zone. Since only individual zones are being processed, this threshold criteria may be one-fourth that used by a conventional printer, which must compare the data in an entire swath to a threshold, assuming four zones per swath are used.

The next step is to build the display list 40, as previously described, wherein parser 50 converts the PCL data from the host computer 48 into data for storage in the display list 40.

The number of data blocks or display list (DL) blocks needed to store the object information for a zone is compared to the zone threshold. If the number of these DL blocks does not exceed the zone threshold, then building the display list 40 is continued for the next zone.

If the number of DL blocks for a zone exceeds the zone threshold, it is then determined whether memory space has been allocated for further processing of this data for the zone. If it is the first iteration of this process, there will be no memory allocated. This memory is typically found in the main printer memory, which would also be used by the display list 40.

Assuming that this is the first iteration of the MEt process, zone memory is now allocated. If such memory is available, then the object information in the DL blocks for that zone is rasterized. The rasterized blocks are then enqueued in a least recently used (LRU) chain. This LRU chain will become relevant when, toward the end of building the display list 40, it is determined that compression of earlier stored data is now necessary to insure sufficient memory for storing the entire display list 40.

The original DL blocks are released, since the rasterized data now stored in the memory will be used instead of the original object information.

The zone threshold for that zone is then reduced to take into account the present size of the zone and, when further data to be stored in that zone comes along, the reduced threshold will be applied to the new data. If subsequent data for that zone then exceeds this lowered threshold, the MEt process described in FIG. 4 will be repeated as necessary.

If it is determined that the number of DL blocks for a zone exceeds the threshold and that there is already zone memory available in the memory, then this zone data is rasterized and stored in the available zone memory. The LRU chain is adjusted to accommodate the new order of use, and the original DL blocks are released. The zone threshold for that zone is then adjusted.

If it is determined that the memory may be depleted before the display list 40 is completed, the zone threshold may be further reduced accordingly.

If it is determined that the number of DL blocks for a zone exceeds the zone threshold and that sufficient memory is not available to store the rasterized data, the zone buffers 61–65 must be temporarily used for storing the rasterized pixel data.

In such a case, the stored rasterized data is compressed using run length encoding. In a preferred embodiment, horizontal and vertical run length encoding is used along with delta row encoding, which determines if changes exist between adjacent rows.

The DL blocks which originally contained this zone data are then released. Space is allocated in the display list 40 memory for the compressed data. Preferably, this space is contiguous within the display list 40 memory. If contiguous space is found, the compressed data is stored in contiguous DL blocks, and the zone threshold is then adjusted accordingly.

If a contiguous space in the display list 40 memory is not found, then several smaller blocks in the memory are then allocated, and the compressed data is then copied into the memory in a fragmented chain. The zone threshold is then adjusted.

If, toward the end of building the display list 40, it is found that the memory is insufficient for storing even the compressed data, then the data in the least recently used (LRU) DL blocks is rasterized and compressed to free up memory space. In such a situation, the zone threshold would be lowered to the level needed to store the entire display list 40 in the memory.

Although a particular MEt process has been described, such a process is not required for carrying out the present invention.

By using the invention, in addition to the reduction in size of the bit-mapped memory buffers for storing rasterized pixel data, the display list memory size may also be reduced from that of a conventional display list memory. This is because the complexity threshold used by threshold circuit 54 (FIG. 3) for each zone may now be only, for example, one-fourth of the conventional complexity threshold for a full swath, since the zones are one-fourth that of a full swath. For a 600 dpi printer, this complexity threshold will therefore be approximately the same threshold as a 300 dpi threshold for a complete swath. This places a maximum ceiling on the memory size for a zone, rather than a maximum ceiling on the memory size for a full swath. Since the matter to be printed in a swath is assumed to vary in complexity, certain zones within a single swath exceeding the complexity threshold may be pre-rasterized and compressed, using a conventional rasterizing and compression device 56, while other zones in the same swath may not exceed the complexity threshold. Treating each zone in the swath as independent from one another thus can result in huge memory savings on complex graphics plots where the complexity varies greatly across a page.

Additionally, processing complexity is reduced over that using conventional techniques, since only the data in a zone need be processed rather than all the data in a swath. This results in faster throughput because fewer pixels need be rendered, located, copied, and erased during each operation.

Additionally, segmenting a swath into a plurality of zones makes it possible to mix 0, 1, and 3-plane zones in a single swath, reducing the amount of processing for each swath and resulting in faster throughput because fewer pixels are rendered, rotated, copied, and erased.

If the pixel height of a zone were less than the pixel height of a single scan of a printhead, then multiple raster images stored in zone buffers 61–65 would need to be formatted by print engine 70 before each scan of the printheads.

It should be understood that the examples used in the various figures for the number of swaths per page, the number of dots per swath, the size of the data blocks, and the size and number of zone buffers 61–65 are for purposes of illustration only. These values can change with page size, resolution and other design factors. For example, depending on the size of a zone, the speed of the image processor 58, and the speed of the print engine 70, the number of zone buffers can range from two to ten or more. The number of zone buffers, however, will usually be one more than that needed to store a full swath, although this assumes the use of a conventional print engine. The granularity of the tiles can be altered by changing its width and height, without affecting the overall architecture. However, there is a display list overhead associated with each tile that results in diminishing returns for tiles below a certain size.

It would be understood that the zone buffers may be part of a single memory whose addresses are allocated for individual zones. The size of a display list block 42 need not be fixed but can be arbitrarily-sized variable length blocks.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method comprising the steps of:
   receiving display instructions in a page description language for displaying one or more objects on a display device;
   identifying zones on a medium on which said one or more objects are to be displayed and assigning objects for being displayed to their respective zones, said medium having a length dimension and a width dimension, said zones comprising a two dimensional array of said zones across said medium consisting of rows and columns of said zones, each row of said zones extending along said width dimension of said medium and each column of said zones extending along said length dimension of said medium, each of said rows containing a plurality of said zones and each of said columns containing a plurality of said zones;

storing object descriptions, describing said objects, in a display list for each of said zones where objects are located;

processing display data in said display list for each of said zones where objects are located to rasterize said display data for each of said zones;

storing rasterized display data from said display list into a bit-mapped memory; and addressing said rasterized display data within said bit-mapped memory for application to a display device for displaying said objects on said medium.

2. The method of claim 1 wherein said display device scans across said medium in a scanning direction to display said one or more objects on said medium, wherein the number of zones across said medium in said scanning direction is N, and wherein said bit-mapped memory allocated for storing said rasterized display data is greater than that needed for N zones but less than that needed for 2N zones.

3. The method of claim 2 wherein said bit-mapped memory has space allocated for N+1 zones.

4. The method of claim 2 wherein N equals four.

5. The method of claim 1 further comprising the step of generating display instructions in a page description language by a host computer for transmission to a receiver connected to said display device, and wherein said step of receiving display instructions comprises receiving said display instructions from said host computer.

6. The method of claim 1 wherein said step of storing object descriptions in said display list for each of said zones comprises:

storing object descriptions, describing said objects, in data blocks of a predetermined number of bytes in a display list memory for each of said zones where objects are located, a position of one or more objects to be displayed in a zone being referenced to boundaries of that zone.

7. The method of claim 1 wherein said step of processing display data in said display list comprises:

addressing data in said display list for each of said zones where objects are located, wherein the data is addressed in the same sequential order of the zones on the medium.

8. The method of claim 1 wherein data in said display list for each of said zones specifies whether objects within a particular zone are color or monochrome, wherein, if said objects in that zone are color, then three sets of bit-mapped data for that zone are stored in said bit-mapped memory, one set for each primary color capable of being displayed by said display device, wherein, if said objects in said zone are monochrome, then one set of bit-mapped data for that zone is stored in said bit-mapped memory, and wherein, if no objects are to be displayed in that zone, then no object description data for that zone is stored in said bit-mapped memory, such that said bit-mapped memory stores 0, 1, or 3 sets of bit-mapped data, of any combination thereof, for a plurality of zones, depending on objects to be displayed across said medium.

9. The method of claim 1 wherein said display device is a printer having one or more scanning printheads, and wherein said step of addressing said rasterized display data within said bit-mapped memory comprises the steps of:

formatting said rasterized display data in said bit-mapped memory for storage in a print buffer memory, data in said print buffer memory being used to control said one or more scanning printheads for at least one scan of said printheads across said medium.

10. The method of claim 9 wherein bit-mapped data in said bit-mapped memory for zones across said medium in a scanning direction of said printheads contains either no data for a zone, one set of monochrome data for a zone, or three sets of primary color data for a zone, or any combination thereof, depending upon objects to be printed in those zones across said medium.

11. The method of claim 1 further comprising the step of performing memory enhancement on display data for storage in said display list for limiting an amount of memory space needed to store object information for a zone, said memory enhancement performing the steps of:

determining whether the memory used for storing object information for a zone exceeds a threshold value;

rasterizing objects within said zone if said object information exceeds said threshold value; and storing rasterized data in said display list corresponding to said objects within said zone.

12. The method of claim 11 further comprising the step of:

adjusting said threshold value for a zone to take into account the amount of data already stored in said display list for that zone.

13. The method of claim 11 further comprising the step of compressing rasterized data for said zone to reduce an amount of data to be stored in said display list for that zone, wherein said step of storing rasterized data in said display list for said zone comprises the step of storing compressed rasterized data in said display list for said zone.

14. The method of claim 11 further comprising the step of allocating memory for storing rasterized data for said zone.

15. The method of claim 14 wherein said step of allocating memory comprises the step of allocating space in said bit-mapped memory for storing said rasterized data for a zone, and wherein said step of storing rasterized data in said display list comprises storing compressed rasterized data from said bit-mapped memory into said display list.

16. An apparatus comprising:

a receiver for receiving display instructions in a page description language for displaying one or more objects on a display device;

a parser connected to said receiver for identifying zones on a medium on which said one or more objects are to be displayed and assigning objects for being displayed to their respective zones, said medium having a length dimension and a width dimension, said zones comprising a two dimensional array of said zones across said medium consisting of rows and columns of said zones, each row of said zones extending along said width dimension of said medium and each column of said zones extending along said length dimension of said medium, each of said rows containing a plurality of said zones and each of said columns containing a plurality of said zones;

a display list memory for storing object descriptions, describing said objects, generated by said parser for each of said zones where objects are located;

an image processor for processing display data in said display list memory for each of said zones where objects are located to rasterize said display data for each of said zones;

a bit-mapped memory connected to said image processor for storing rasterized display data from said display list memory for each of said zones; and a formatter for addressing said rasterized display data within said bit-mapped memory and placing said rasterized display data in a format for use by a display device for displaying said objects on said medium.

17. The apparatus of claim 16 further comprising said display device, wherein said display device is a printer having one or more printheads which scan across said medium in a scanning direction to print said one or more objects on said medium, wherein the number of zones across said medium in said scanning direction is N, and wherein said bit-mapped memory allocated for storing said rasterized display data is greater than that needed for N zones but less than that needed for 2N zones.

18. The apparatus of claim 17 wherein said bit-mapped memory has space allocated for N+1 zones.

19. The apparatus of claim 16 further comprising a means for performing memory enhancement on display data for storage in said display list for limiting an amount of memory space needed to store object information for a zone, said means for performing memory enhancement performing the steps of:
   determining whether the memory used for storing object information for a zone exceeds a threshold value;
   rasterizing objects within said zone if said object information exceeds said threshold value; and
   storing rasterized data in said display list corresponding to said objects within said zone.

20. The apparatus of claim 19 wherein said means for performing memory enhancement also performs the step of compressing rasterized data for said zone to reduce an amount of data to be stored in said display list for that zone, wherein said step of storing rasterized data in said display list for said zone comprises the step of storing compressed rasterized data in said display list for said zone.

21. A method preparing data for printing on a print medium having fixed horizontal and vertical dimensions, comprising:
   segmenting a page of object information indicative of one or more objects to be subsequently printed into a plurality of two dimensional zones arranged in a matrix array, said matrix array having horizontal and vertical dimensions corresponding to the fixed horizontal and vertical dimensions of the print medium;
   rasterizing only those portions of the segmented page of object information having an object containing zone; and
   storing the rasterized object information in a fixed number of zone buffers for subsequent printing on the print medium, said fixed number being a number one greater than the total number of zones in a band of object information extending across the fixed horizontal dimension of the print medium.

22. A method of preparing data according to claim 21, wherein said step of segmenting includes:
   receiving an incoming data stream;
   segmenting said incoming data stream into at least one page of object information to be subsequently printed on the print medium; and
   storing the segmented page of object information in a display list, said display list defined by a plurality of data blocks, each data block including an opcode identifier that uniquely identifies the presence of an object type to be printed in said display list and the location of image data indicative of the position of the object type in a corresponding object containing zone referenced to a set of zone boundaries of that zone.

23. A method of preparing data according to claim 22, wherein said step of segmenting further includes:
   selecting sequentially in a raster scan like manner, individual ones of the zones for transforming them into corresponding blocks of data for storage in said display list;
   clipping each object in the selected zone to a horizontal zone boundary and a vertical zone boundary for bit mapping purposes; and
   storing the clipped objects in said display list for subsequent processing for printing purposes.

24. A method of preparing data according to claim 22, wherein said step of rasterizing includes:
   determining whether sequentially selected individual ones of the data blocks contain image data.

25. A method of preparing data according to claim 21, further comprising:
   determining whether the object information in an object containing zone exceeds a predetermined storage capacity; and
   compressing the object information in any object containing zone whose memory storage capacity requirement exceeds said predetermined storage capacity.

26. A method of preparing data according to claim 25, wherein said step of compressing includes:
   replacing the information in the object containing zone with a memory capacity requirement exceeding said predetermined storage capacity with rasterized compressed object information that does not require a storage capacity greater than said predetermined storage capacity.

27. A system for facilitating the printing of data on a print medium having fixed horizontal and vertical dimensions, comprising:
   a parser for segmenting a page of object information indicative of one or more objects to be subsequently printed into a plurality of two dimensional zones, said plurality of zones being arranged in a matrix array having horizontal and vertical dimensions corresponding to the fixed horizontal and vertical dimensions of the print medium;
   said parser generating a plurality of data blocks, where each data block includes an opcode identifier that uniquely identifies the presence of any object type to be printed on the print medium and image data indicative of the position of the object type in a corresponding object containing zone referenced to a set of zone boundaries of that zone;
   an image processor coupled to said parser for rasterizing only those portions of the segmented page of object information having an object containing zone; and
   a fixed number of zone buffers for temporarily storing the rasterized object information to facilitate its subsequent printing on the print medium, said fixed number being a number one greater than the total number of zones in a band of object information extending across the fixed horizontal dimension of the print medium.

28. A system according to claim 27, wherein said parser includes:
   a display list memory for storing said plurality of data blocks, said display list having a limited storage capacity.

29. A system according to claim 28, further comprising:

a complexity threshold circuit responsive to said parser for determining whether the object information in an object containing zone exceeds a predetermined storage capacity; and a rasterization circuit responsive to said complexity threshold circuit for compressing the object information in any object containing zone whose memory storage capacity requirement exceeds said predetermined storage capacity;

said rasterization circuit causing the information in the object containing zone with a memory capacity requirement exceeding said predetermined storage capacity to be replaced with rasterized compressed object information that does not require a storage capacity greater than said predetermined storage capacity.

* * * * *